United States Patent [19]

Mishima

[11] Patent Number: 5,263,146
[45] Date of Patent: Nov. 16, 1993

[54] MULTIPROCESSOR SYSTEM INCLUDING AN EXCLUSIVE ACCESS CONTROLLER WITH LOCK REQUEST HOLDING AND GRANT CIRCUITS

[75] Inventor: Takayoshi Mishima, Tokyo, Japan

[73] Assignee: NEC Corporation, Tokyo, Japan

[21] Appl. No.: 558,331

[22] Filed: Jul. 27, 1990

[30] Foreign Application Priority Data

Jul. 27, 1989 [JP] Japan ................. 1-192602

[51] Int. Cl.$^5$ ................. G06F 13/16; G06F 13/364
[52] U.S. Cl. ................. 395/425; 364/228.1; 364/DIG. 1; 395/725
[58] Field of Search ................. 395/425, 725; 364/200 MS File, 900 MS File

[56] References Cited

U.S. PATENT DOCUMENTS

| | | |
|---|---|---|
| 4,574,350 | 3/1986 | Starr ................. 395/725 |
| 4,641,266 | 2/1987 | Walsh ................. 395/325 |
| 4,733,352 | 3/1988 | Nakamura et al. ................. 395/425 |
| 4,835,672 | 5/1989 | Zenk et al. ................. 395/425 |
| 4,984,153 | 1/1991 | Kregness et al. ................. 395/425 |
| 5,115,499 | 5/1992 | Stiffler et al. ................. 395/425 |

*Primary Examiner*—Glenn Gossage
*Attorney, Agent, or Firm*—Foley & Lardner

[57] ABSTRACT

An exclusive access controller is incorporated into a multiprocessor system in which each processor generates a lock request and subsequently a memory access request when accessing shared data stored in the main memory of the system. Lock requests from the processors are held in a lock request holding circuit and one of the lock requests is selected by lock request arbitration circuitry and stored in a lock request grant circuit. Each processor includes a memory access inhibit circuit that inhibits the process from generating a memory access request until its lock request is stored in the lock request grant circuit.

3 Claims, 2 Drawing Sheets

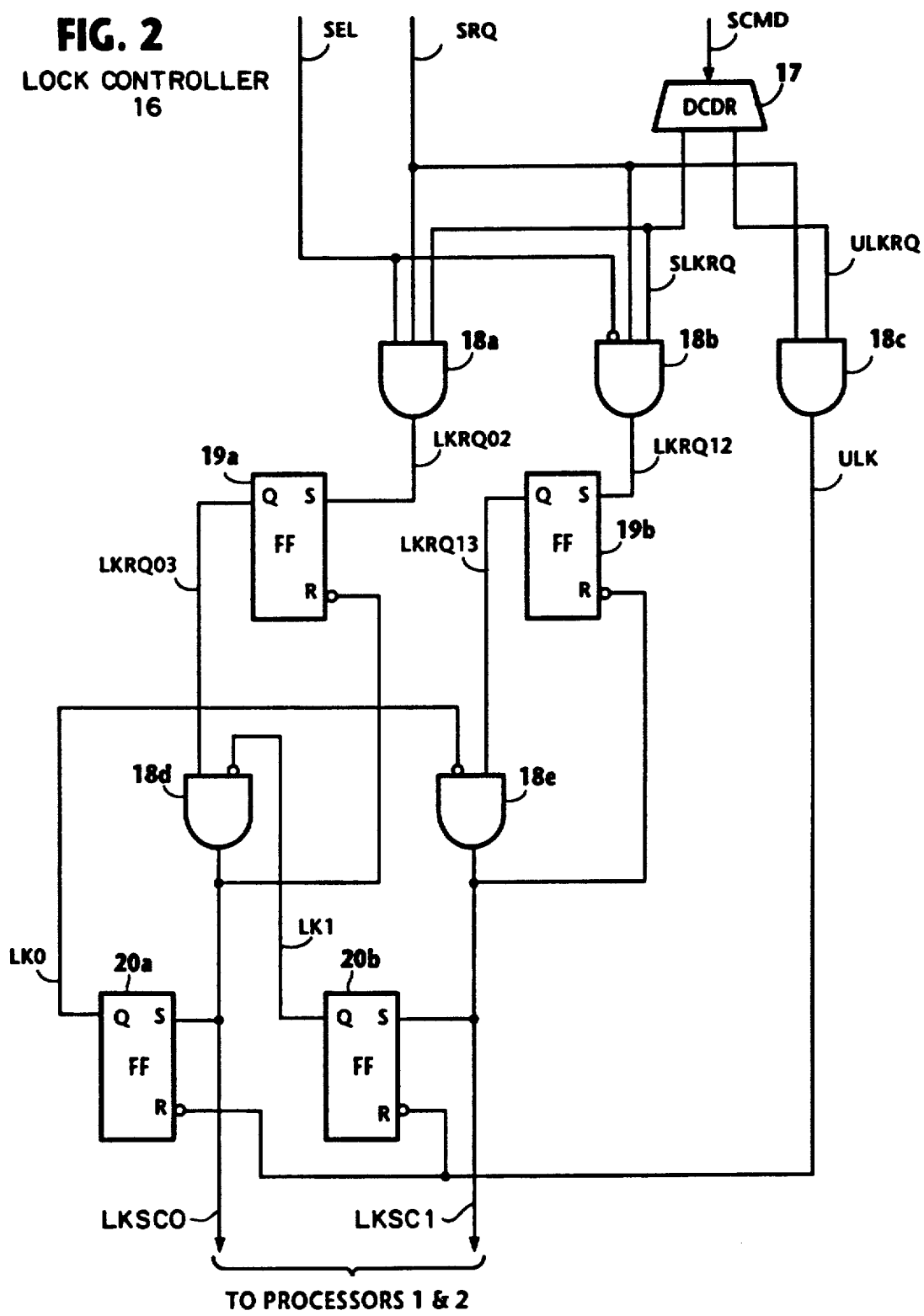

MULTIPROCESSOR SYSTEM INCLUDING AN EXCLUSIVE ACCESS CONTROLLER WITH LOCK REQUEST HOLDING AND GRANT CIRCUITS

BACKGROUND OF THE INVENTION

The present invention relates generally to multiprocessor systems, and more specifically to an exclusive access controller for a multiprocessor system.

With prior art hardware-implemented exclusive access controllers employed in multiprocessors, a source processor issues a lock request to the exclusive access controller to cause the processor to make a lock attempt for exclusive access to shared data in the main memory. The firmware of the source processor translates the result of the lock attempt from the exclusive access controller before accessing a common resource stored in the main memory. If the request is not granted in a given attempt, the firmware repeats a lock request until the request is granted. However, shortcomings of this type of exclusive access controller are that (1) complex decoding circuitry is required for interpreting the result of the lock attempt and that (2) the requesting processor must wait a certain period of time before it can access the shared data following a grant of a lock request. All these factors combine to limit the overall efficiency of the multiprocessor system.

SUMMARY OF THE INVENTION

It is therefore an object of the present invention to provide an improved exclusive access controller for a multiprocessor system by eliminating the need for each request source processor to repeat lock requests.

The present invention is concerned with a multiprocessor system in which each processor generates a lock request and subsequently a memory request when accessing shared data stored in the main memory. According to the present invention, a lock request from each of the processors is received and held in a latch so that one or more of the lock requests may be held in the latch if such lock requests are simultaneously or sequentially generated by the processors. One of the lock requests held in the latch is selected. Each of the processors is prevented from generating a memory request from the time a lock request is generated to the time that the lock request is selected.

BRIEF DESCRIPTION OF THE DRAWINGS

The present invention will be described in further detail with reference to the accompanying drawings, in which:

FIG. 2 is a circuit diagram of the lock controller of FIG. 1.

DETAILED DESCRIPTION

Figure 1:
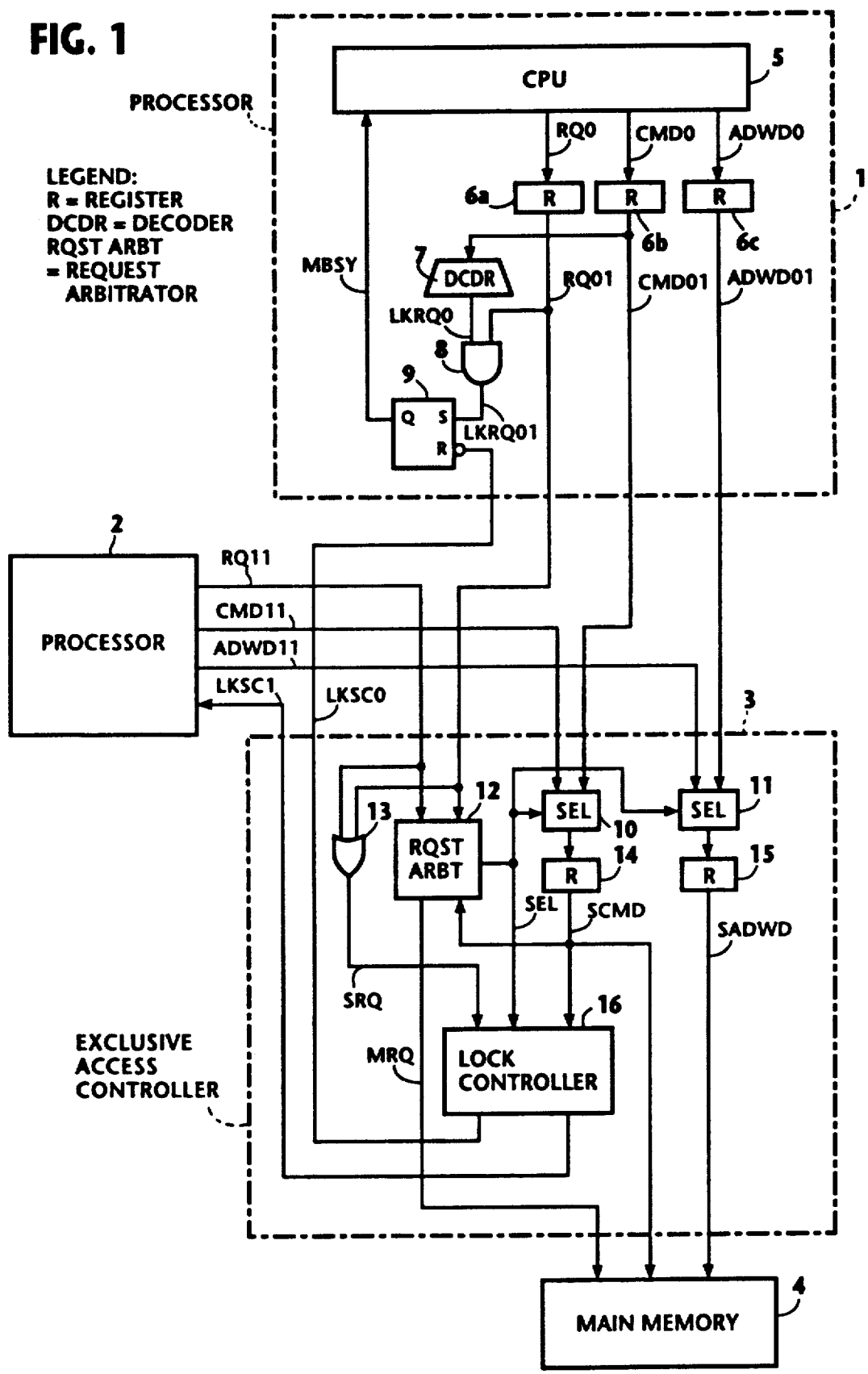
FIG. 1 is a block diagram of a multiprocessor system according to the present invention.

Referring now to FIG. 1, there is shown a multiprocessor system embodying the present invention. For purposes of disclosure, only two processors 1 and 2 of identical hardware configuration are illustrated, with processor 1 shown in detail as operating as a lock-request source processor. An exclusive access controller 3 is provided which includes a lock controller 16 and is connected to main memory 4. Processor 1 has a CPU 5 that generates request signal RQ0, mode command signal CMD0, and address/write data signal ADWD0 to registers 6a, 6b, 6c, whose outputs are connected respectively to a request arbitrator 12 and selectors 10 and 11 of the exclusive access controller 3. The outputs of registers 6a to 6c are fed to the exclusive access controller as RQ01, CMD01 and ADWD01. Processor 2 has a similar set of output terminals from which signals RQ11, CMD11 and ADWD11 may be applied to exclusive access controller 3 when a request is made from the processor.

When processor 1 issues a lock request, the CPU 5 applies a request signal RQ0 to register 6a and a logic 1 command signal CMD0 (indicating lock request) to register 6b, resulting in the generation of logic 1's at the outputs RQ01 and CMD01 of registers 6a and 6b. Output CMD01 is applied to selector 10 as a lock command signal as well as to a decoder 7 which generates a logic 1 output LKRQ0 at a first input of an AND gate 8 to the second input of which is also applied the RQ01 (logic 1) from register 6a. Thus, the output of AND gate 8 goes high, producing a logic 1 output LKRQ01. An access inhibit flip-flop 9 is provided which is connected to the output of AND gate 8. This flip-flop is set in response to a logic 1 output of AND gate 8 to supply a logic 1 output on lead MBSY to CPU 5 to prevent it from generating a subsequent lock request until flip-flop 9 is reset.

Exclusive access controller 3 has an OR gate 13 to which the RQ01 and RQ11 outputs of processors 1 and 2 are applied. Since RQ01 is at logic 1, OR gate 13 applies a logic 1 output SRQ to lock controller 16. On the other hand, request arbitrator 12 receives RQ01 and RQ11 signals from processors 1 and 2 and selects one of the inputs through arbitration. The output terminal SEL goes high if RQ01 is selected, and goes low if RQ11 is selected. The output SEL is applied to lock controller 16 as well as to selector 10 to which the signals CMD01 and CMD11 are supplied from processors 1 and 2. In response to a logic 1 signal SEL, selector 10 couples the signal CMD01 to a register 14, resulting in a lock/unlock command signal SCMD, which is applied to lock controller 16.

With logic 1 inputs SRQ, SEL and SCMD being applied, lock controller 16 will proceed to effect a lock control in a manner as will be described in detail later. If lock controller 16 is successful in this attempt, it supplies a logic 1 LKSC0 or LKSC1 to the requesting processor. If the request source is processor 1, LKSC0 goes high, and flip-flop 9 of processor 1 is reset, switching the logic state of signal line MBSY to logic 0 and enabling processor 1 to generate a memory access request. This allows the firmware of processor 1 to resume its operation.

If processor 1 is making an attempt to access main memory 4, CPU 5 generates a logic 1 RQ0 signal and a mode command signal CMD0 which indicates whether the attempted access is to be made in a lock request mode (CMD0=logic 1) or in a memory access mode (CMD0=logic 0), and generates an address/write data signal ADWD0. These signals are fed through registers 6a, 6b, 6c to exclusive access controller 3 on leads RQ01, CMD01 and ADWD01. On receiving the signal RQ01, request arbitrator 12 provides arbitration between signals on leads RQ01 and RQ11 if there is a contention between processors 1 and 2. If signal RQ01 is selected, the output terminal SEL is at logic 1 and causes selector 10 to apply signal CMD01 from processor 1 to register 14. This register applies a logic 1 memory access request signal on output lead SCMD to request arbitrator 12, lock controller 16 and to main memory 4, indicating that the memory access request is originating from processor 1.

With the logic 1 memory request signal SCMD being applied, request arbitrator 12 applies a logic 1 memory access signal on output lead MRQ to main memory 4. Selector 11 is connected to the outputs ADWD01 and ADWD11 from processors 1 and 2. The logic 1 state of control signal SEL causes selector 11 to couple the signal on lead ADWD01 from processor 1 to register 15, and to main memory 4 on lead SADWD.

As shown in FIG. 2, lock controller 16 includes, AND gates 18a, 18b and 18c, and a decoder 17. The SEL signal from arbitrator 12 is supplied to AND gates 18a and 18b, and the SRQ signal from OR gate 13 is supplied to AND gates 18a, 18b and 18c. The SCMD signal from register 14 is supplied to decoder 17. If the signal SCMD at the input of decoder 17 indicates that lock is requested, decoder 17 applies a logic 1 SLKRQ signal to AND gates 18a and 18b, and if the signal SCMD indicates an unlock request, decoder 17 applies a logic 1 ULKRQ signal to AND gate 18c. A lock request holding circuit is formed by first (or lock request) flip-flops 19a and 19b which are associated respectively with processors 1 and 2. A lock grant circuit is formed by AND gates 18d, 18e and second (or lock grant) flip-flops 20a and 20b, with AND gates 18d and 18e respectively associated with flip-flops 20a and 20b. AND gate 18d has a noninverting input connected to the output of flip-flop 19a and an inverting input connected to the output of flip-flop 20b and an output connected to the set input of flip-flop 20a and to the reset input of flip-flop 19a. Likewise, AND gate 18e has a noninverting input connected to the output of flip-flop 19b and an inverting input connected to the output of flip-flop 20a and an output connected to the set input of flip-flop 20b and the reset input of flip-flop 19b.

If a lock request from processor 1 is granted, the logic state of each of leads SRQ, SLKRQ and SEL is logic 1, and thus AND gate 18a produces a logic 1 signal LKRQ02 which causes lock-request flip-flop 19a to be set, so that its output lead LKRQ03 switches to logic 1 to store the lock request from processor 1. If no lock request is granted to processor 2, lock-grant flip-flop 20b is in a reset state and the state of its output LK1 is at logic 0, which is inverted at the negative input of AND gate 18d. Since the input lead LKRQ03 of this AND gate 18d is at logic 1, a logic 1 appears at the output LKSC0 of AND gate 18d, setting lock-grant flip-flop 20a, while at the same time resetting lock request flip-flop 19a. In this way, the lock controller 16 succeeds in granting lock to processor 1 and sends a lock grant signal on lead LKSC0 to processor 1 where it is used to reset flip-flop 9. Thus, the CPU 5 of processor 1 is now allowed to generate a memory request, which appears on lead CMD01 to selector 10.

If processor 2 has already issued a lock request and the request has been granted before the lock request of processor 1 is generated, lock-grant flip-flop 20b is in a set state, the output lead LKSC0 of AND gate 18d is at logic 0, and flip-flop 20a holds a reset condition. The lock attempt of processor 1 is therefore unsuccessful. However, flip-flop 19a is in a set condition, indicating that the lock request from processor 1 is held. When processor 2 issues an unlock request, the logic state of leads SRQ and ULKRQ switches to logic 1, activating AND gate 18c to produce a logic 1 ULK signal at the rest input of flip-flops 20a and 20b. Thus, flip-flops 20a, 20b are reset, clearing the lock granted to processor 2 and switching the logic state of output LK1 to 0 to enable AND gate 18d to produce a logic 1 output on lead LKSC0 which sets flip-flop 20a and resets flip-flop 19b.

It is seen therefore that the exclusive access controller of the present invention eliminates the need for each processor to repeatedly issue a lock request whenever a lock request is rejected. The firmware of each processor is relieved from the burden of monitoring the result of each lock request to determine whether it is granted or not, and hence, it can concentrate on a coding process. Thus, the firmware of each processor can be simplified and its operating time reduced.

The foregoing description shows only one preferred embodiment of the present invention. Various modifications will be apparent to those skilled in the art without departing from the scope of the present invention which is only limited by the appended claims. Therefore, the embodiment shown and described is only illustrative, not restrictive.

What is claimed is:

1. A multiprocessor system comprising:

a plurality of processors; and an exclusive access controller for controlling exclusive access from each of said processors to shared data stored in a memory;

each of said processors generating a lock request and subsequently a memory request when accessing said memory and an unlock request at an end of access to said memory;

said exclusive access controller comprising a lock request holding circuit including a plurality of first flip-flops associated respectively with said processors for holding lock requests generated by respective ones of said processors so that one or more of said lock requests may be held when lock requests are generated by said processors;

a lock request grant circuit including a plurality of logic gates and a plurality of second flip-flops respectively associated with said first flip-flops, each of said logic gates having a noninverting input connected to an output of an associated one of said first flip-flops, an output connected to a set input of an associated one of said second flip-flops and an inverting input connected to an output of another one of said second flip-flops so that one of said lock requests held in said first flip-flops is selected and stored in an associated one of said second flip-flops, said second flip-flops being responsive to an unlock request from one of said processors for resetting the second flip-flop in which the selected lock request is stored, each of said processors including memory access inhibit means for preventing that processor from generating another memory request until a lock request of that processor is stored in the associated one of said second flip-flops.

2. The system as claimed in claim 1, further comprising lock request arbitrator means for receiving a lock request from each of said processors, and selectively supplying one of said lock requests to one of said first flip-flops.

3. The system as claimed in claim 1, wherein the output of each of said logic gates is further connected to a reset input of the associated one of said first flip-flops.

* * * * *